United States Patent
Abe et al.

(10) Patent No.: US 6,891,002 B2
(45) Date of Patent: May 10, 2005

(54) PROCESS FOR PRODUCING POLYOLEFIN

(75) Inventors: Shinji Abe, Tokyo (JP); Shotaro Matsuda, Ichihara (JP); Satoru Ohtani, Ichihara (JP); Hiroto Nishida, Ichihara (JP); Michiharu Sakata, Ichihara (JP); Tomohiro Arase, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/395,254

(22) Filed: Mar. 25, 2003

(65) Prior Publication Data

US 2003/0181605 A1 Sep. 25, 2003

(30) Foreign Application Priority Data

Mar. 25, 2002 (JP) ........................ 2002-083811
Jan. 21, 2003 (JP) ........................ 2003-012187

(51) Int. Cl.$^7$ ................................. C08F 2/34
(52) U.S. Cl. ............... 526/68; 526/89; 526/901; 526/217; 526/236; 526/348.2; 526/348.3; 526/348.4; 526/348.5; 526/348.6; 526/211; 526/209
(58) Field of Search .................. 526/68, 89, 901, 526/217, 236, 348.2, 348.3, 348.4, 348.5, 348.6, 211, 209

(56) References Cited

U.S. PATENT DOCUMENTS 6,180,729 B1    1/2001   Lange et al.
6,369,174 B1 *  4/2002   Wenzel et al. ............... 526/74

FOREIGN PATENT DOCUMENTS

| EP | 0 107 127 A1 | 5/1984 |
|---|---|---|
| EP | 0 229 368 A2 | 7/1987 |
| JP | 2000-313716 A | 11/2000 |
| JP | 2000-313717 A | 11/2000 |
| JP | 2000-327707 A | 11/2000 |

* cited by examiner

Primary Examiner—William K. Cheung
(74) Attorney, Agent, or Firm—Birch, Stewart, Kolasch & Birch, LLP

(57) ABSTRACT

A process for producing a polyolefin according to the present invention comprises (co) polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor. The present invention can provide a process for producing a polyolefin, the process ensuring that the prevention of clogging caused by the generation of sheet or block polymers and a high efficiency of the production of a polyolefin due to good catalytic activity can be accomplished at the same time and also having superb continuous productivity.

19 Claims, 3 Drawing Sheets

PROCESS FOR PRODUCING POLYOLEFIN

This nonprovisional application claims priority under 35 U.S.C. §119(a) on Patent Application No(s). 2002-083811 and 2003-012187 filed in JAPAN on Mar. 25, 2002 and Jan. 21, 2003, respectively, which is (are) herein incorporated by reference.

FIELD OF THE INVENTION

The present invention relates to a process for producing a polyolefin by (co) polymerizing one or two or more α-olefins in a vapor phase by using a fluidized-bed reactor.

BACKGROUND OF THE INVENTION

Polyolefins such as polyethylene, polypropylene, ethylene/α-olefin copolymers and propylene/α-olefin copolymers are used in various uses. For example, films formed of a straight-chain low-density polyethylene (LLDPE) are superior in various characteristics, for example, these films have excellent heat sealing characteristics, high softness and high toughness, are superior in water resistance, humidity resistance and chemical resistance and are inexpensive, and are therefore widely utilized from of old.

These polyolefins are typically produced by a liquid phase polymerization method such as solution polymerization and slurry polymerization. Particularly many LLDPEs are produced by copolymerizing ethylene with an α-olefin having 3 or more carbon atoms in the presence of a Ziegler catalyst by using a liquid phase polymerization method.

In the meantime, if such a polyolefin is produced by a vapor phase polymerization method, the polymer can be obtained in the form of a particle after polymerization and a step of precipitating particles and a step of separating particles from the polymerization solution become needless and therefore the production process can be simplified. This is the reason why studies concerning the production of polyolefins, particularly, LLDPEs by using a vapor phase polymerization method have been made energetically in recent years.

In the vapor phase polymerization method, polymerization is carried out with fluidizing solid particles consisting of a catalyst and a produced polyolefin by supplying polymerizing monomer gas from the lower part of a reactor to form a fluidized bed and to thereby run a polymerization reaction and withdrawing the produced polymer continuously or intermittently from the reactor.

In such a vapor phase polymerization method, there is a large problem concerning the removal of polymerization heat. Conventionally, a method is known in which a liquefiable saturated aliphatic hydrocarbon is supplied to a fluidized-bed reactor and the gas discharged from the reactor is compressed and cooled to liquefy a part of the saturated aliphatic hydrocarbon, to circulate the saturated aliphatic hydrocarbon to the reactor in a vapor-liquid mixed state, thereby removing polymerization heat.

However, even if the conventional heat removing method as aforementioned is adopted, it is difficult to remove heat evenly from the fluidized bed and therefore local heating in the fluidized bed is easily caused, giving rise to the problem that phenomena such as sheeting and melting tend to occur. When such a sheet or chunk polymer is produced, the polymer is deposited on a gas distributing plate disposed on the lower portion of the fluidized bed and the deposited polymer becomes an obstacle to remain a normal fluidizing state and also clogs the holes of the gas distributing plate, which occasionally hinders the normal operation of the reaction system significantly.

In the aforementioned vapor phase polymerization method, olefins are (co) polymerized in the presence of a solid catalyst, for example, such as a solid titanium type catalyst and support carrying type metallocene type catalyst to produce a polyolefin. Many of the foregoing solid catalysts have low fluidity, making it difficult to supply the catalyst to a polymerizing unit occasionally. Also, these catalysts are easily charged with electricity, leading to, for example, coagulation of the catalyst and adhesion of the catalyst to the wall surface of a polymerizing unit, affording opportunity for formation of a sheet or chunk polymer. Such a problem is improved to some extent by carrying a surfactant on the solid catalyst. However, this method has the problem of reduced polymerization activity.

For example, a method of improving the fluidity of a polymer powder is described in the publication of Japanese Patent Application Laid-Open No. 2000-313717, the method being characterized in that an aliphatic amide is supplied such that it exists in an amount of 0.1 to 400 ppm based on the weight of a polymerization powder in a powder fluidized circumstance where the content of water in the total gas is 2 ppm or less in a polymerization step or a step of storing the resulting polymer powder. In this publication, it is disclosed that static electricity of a polymer is prevented and the clogging caused by the generation of the sheet or chunk polymer as aforementioned is suppressed by using an aliphatic amide.

However, aliphatic amides poison a catalyst and drops the bulk density of the produced polyolefin by nature. Therefore, the use of a large amount of these aliphatic amides decreases catalyst activity and drops the bulk density of a polyolefin particle, giving rise to the problem of a remarkable reduction in the production efficiency of a polyolefin. Such a problem is known to be solved by using a polyoxyalkylene glycol (e.g., a polyalkylene oxide block) as shown in the publication of Japanese Patent Application Laid-Open No. 2000-313716 and in Japanese Patent Application Laid-Open No. 2000-327707. Specifically, it is disclosed that if polymerization is carried out in the presence of this compound, the amount of a chunk and sheet polymer to be produced is limited to the same level as in the case of using a higher aliphatic amide without any drop in the bulk density of the particle and high catalyst activity can be maintained.

However, the problem in the case of using a polyoxyalkylene glycol singly is that when changing reaction conditions significantly or when reaction conditions are disturbed, the fluidity of solid particles becomes ununiform temporarily. Even if the amount of a polyoxyalkylene glycol to be added is regulated, there is the case where the effect of suppressing the generation of a chunk or sheet polymer can be obtained insufficiently.

The inventors of the present invention have made earnest studies to solve the aforementioned problem and as a result, found that a polyolefin exhibiting high catalyst activity and a good particle quality (bulk density) can be produced while suppressing the generation of a chunk or sheet polymer even in the case where reaction conditions are disturbed by polymerizing an α-olefin in a vapor phase under the presence of at least one compound selected from (B) an aliphatic amide and (C) a nonionic surfactant constituted only of carbon, oxygen and hydrogen atoms and (A) a saturated aliphatic hydrocarbon. The present invention was thus completed. It has been also found that, particularly, in the case of carrying out vapor phase polymerization in the presence of the saturated aliphatic hydrocarbon (A) with allowing the aliphatic amide (B) and the nonionic surfactant (C) constituted only of carbon, oxygen and hydrogen atoms to coexist, the amount of a chunk or sheet polymer to be produced is significantly restricted even in the case where a sudden variation in reaction conditions is caused and the reaction system is disturbed and also the catalyst activity is maintained for a long period of time.

OBJECT OF THE INVENTION

The present invention is to solve the prior art problem as aforementioned and has the object of providing a process for producing a polyolefin, the process enabling the production of a polyolefin having excellent particle qualities (bulk density) efficiently in the condition that the amount of generation of a sheet polymer or a chunk polymer which is a cause of clogging is restricted and exhibiting superb continuous productivity even in the case where a sudden variation in reaction conditions is caused and the reaction system is disturbed.

SUMMARY OF THE INVENTION

The present invention relates to a process for producing a polyolefin, the process comprising (co) polymerizing one or two or more α-olefins in a vapor phase in a fluidized-bed reactor, wherein;

the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor.

In the present invention, the saturated aliphatic hydrocarbon (A) is supplied to the inside of the fluidized-bed reactor in a vapor-liquid two-phase state together with the α-olefin and at least one compound selected from the aliphatic amide (B) and the nonionic surfactant (C) constituted only of carbon, oxygen and hydrogen atom to remove at least a part of polymerization heat by the vaporization of the liquid saturated aliphatic hydrocarbon. However, the saturated aliphatic hydrocarbon is not necessarily supplied in a vapor-liquid two phase state to the reactor, but may be supplied in a vapor phase state to the reactor.

Examples of the polyolefin obtained by the process for producing a polyolefin according to the present invention include a copolymer of ethylene and at least one α-olefin having 3 to 20 carbon atoms.

In the case of making said aliphatic amide (B) exist, the aliphatic amide is made to exist in an amount of $0.1 \times 10^{-6}$ to $400 \times 10^{-6}$ parts by weight based on one part by weight of the produced polyolefin in said fluidized-bed reactor.

As the aliphatic amide (B), a fatty acid diethanolamide represented by the following formula (I) is preferable.

$$(C_mH_{2m+1}CO)N(CH_2CH_2OH)_2 \quad (I)$$

wherein m is integer in a range from 1 to 30.

These fatty acid diethanolamides may be used alone or in combinations of two or more.

The nonionic surfactant (C) constituted only of carbon, oxygen and hydrogen atoms is made to exist in an amount of $0.1 \times 10^{-6}$ to $200 \times 10^{-6}$ parts by weight based on one part by weight of the produced polyolefin. Particularly, a polyoxyalkylene glycol represented by the following formula (II) is preferable.

$$HO-(CH_2CH_2O)_m-[CH_2CH(CH_3)O]_n-(CH_2CH_2O)_pH \quad (II)$$

wherein m, n and p denote the numbers of average repeat units, wherein m is in a range from 1 to 20, n is in a range from 2 to 50 and p is in a range from 1 to 20.

When the aliphatic amide (B) and the nonionic surfactant (C) constituted only of carbon, oxygen and hydrogen atoms are made to coexist, the amounts of these components (B) and (C) are $0.1 \times 10^{-6}$ to $400 \times 10^{-6}$ parts by weight and $0.1 \times 10^{-6}$ to $200 \times 10^{-6}$ parts by weight respectively. (C)/(B) is preferably 1/20 to 1/3 (ratio by weight) and more preferably 1/10 to 1/5 (ratio by weight).

DETAILED DESCRIPTIONS OF THE INVENTION

Figure 1:
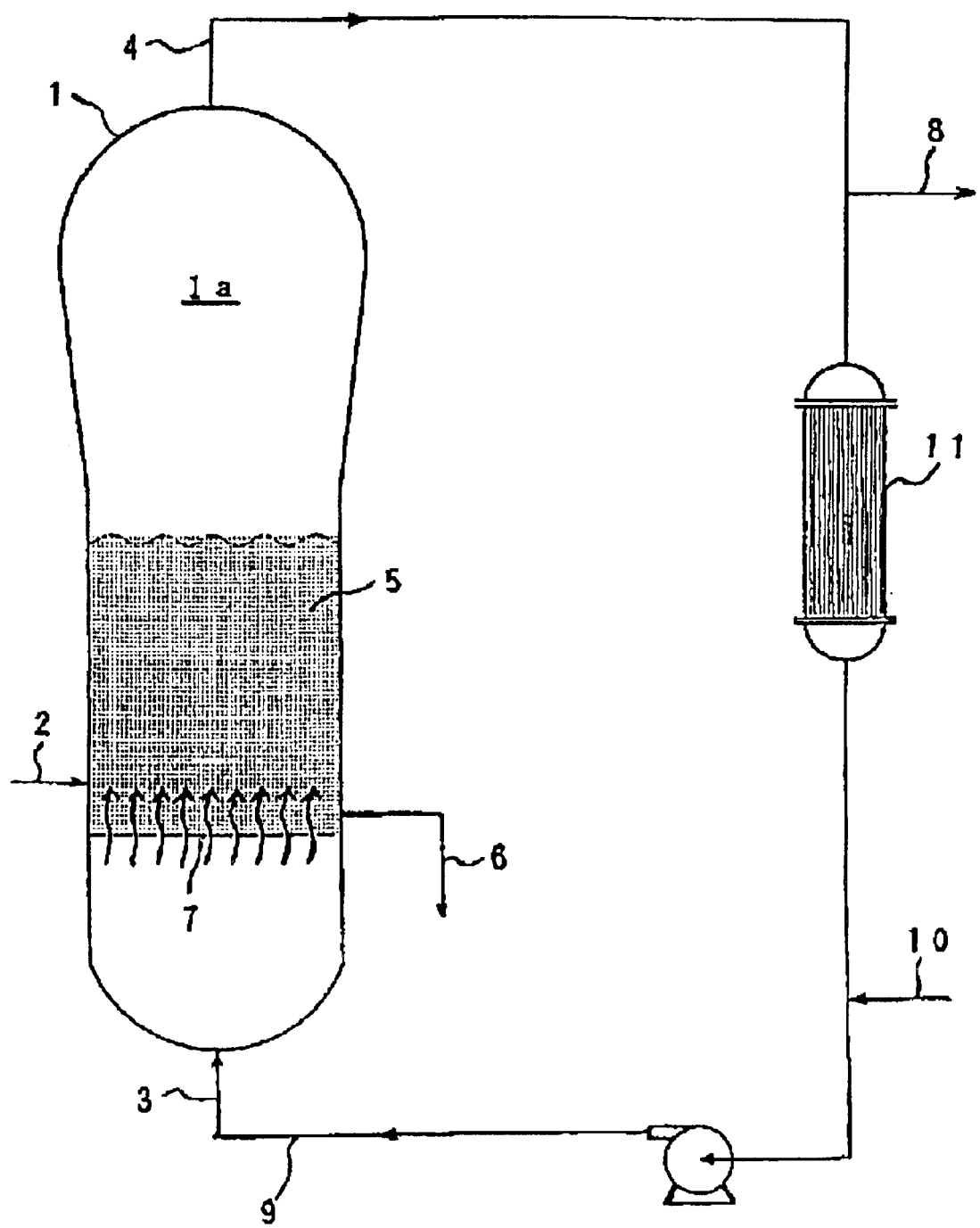
FIG. 1 is a schematic explanatory view of one example of a polymerization process in which the polymerization of an α-olefin is carried out in one stage in a process for producing a polyolefin according to the present invention.

A process for producing a polyolefin according to the present invention will be hereinafter explained in detail. It should to be noted that there is the case where the term "polymerization" is used in terms of meanings implying not only homopolymerization but also copolymerization, and also there is the case where the term "polymer" is used in terms of meanings implying not only a homopolymer but also a copolymer.

In the process for producing a polyolefin according to the present invention, when one or two or more α-olefins are supplied to a fluidized-bed reactor in which polymer particles including, for example, a catalyst is kept in a fluidizing state to produce a polyolefin by a vapor phase polymerization reaction, (A) a saturated aliphatic hydrocarbon and at least one compound selected from (B) an aliphatic amide and (C) a nonionic surfactant constituted only of carbon, oxygen and hydrogen atoms are supplied together with the α-olefin, the concentration of the saturated aliphatic hydrocarbon (A) in the reactor is made to be typically 1 mol % or more and preferably 1 to 25 mol % and $0.1 \times 10^{-6}$ to $400 \times 10^{-6}$ parts by weight of the aliphatic amide (B) and/or $0.1 \times 10^{-6}$ to $200 \times 10^{-6}$ parts by weight of the nonionic surfactant (C) constituted only of carbon, oxygen and hydrogen atoms per 1 part by weight of the produced polyolefin in the reactor are made to exist to carry out (co) polymerization preferably at a temperature close to the dew point of the vapor phase in the reactor.

Here, the present invention will be explained in detail with reference to FIG. 1.

A catalyst is supplied from a line 2 to a fluidized-bed reactor 1. Fluidizing gas containing an olefin (polymerizing monomer), (A) a saturated aliphatic hydrocarbon put in a vapor-liquid mixed state and at least one compound selected from (B) an aliphatic amide and (C) a nonionic surfactant constituted only of carbon, oxygen and hydrogen atoms is blown through a distributing plate such as a perforated plate from a supply port 3 disposed on the lower portion of a reactor 1, the flow rate of the gas is decelerated in a decelerating zone 1a disposed on the upper portion of the reactor 1 and the gas is discharged to the outside of the reactor 1 from a line 4 disposed on the upper portion of the reactor 1 to allow the gas to pass through the inside of the reactor 1, thereby fluidizing polymer particles containing the catalyst to form a fluidized bed (reaction system) 5.

In the present invention, the fluidizing gas introduced from the supply port 3 as aforementioned may be passed through at such a flow rate as to be able to keep the fluidized bed 5 in a fluidizing state by the gas. Specifically, the amount of the gas introduced from the support 3 is about $3U_{mf}$ to $50U_{mf}$ and preferably about $5U_{mf}$ to $30U_{mf}$, where $U_{mf}$ is the minimum fluidizing rate of the fluidized bed 5.

Also, it is possible to stir the fluidized bed 5 mechanically, for example, by using various stirrers such as an anchor type stirrer, screw type stirrer and ribbon type stirrer. Also, the reactor 1 may be provided with a scraper.

As aforementioned, the α-olefin is supplied to the fluidized bed 5 to carry out polymerization or copolymerization. Specific examples of the α-olefin include α-olefins having 2 to 20 carbon atoms such as ethylene, propylene, 1-butene, 1-pentene, 1-hexene, 4-methyl-1-pentene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. Among these α-olefins, it is preferable to copolymerize ethylene with an α-olefin having 4 to 10 carbon atoms and also, ethylene with an α-olefin having 5 to 8 carbon atoms. Further, ethylene may be copolymerized with two or more α-olefins.

Besides olefins, other polymerizable monomers may be copolymerized according to the need. For example, vinyl type monomers such as styrene, vinyl chloride, vinyl acetate, vinylacrylate, methylmethacrylate, tetrafluoroethylene, vinyl ether and acrylonitrile, conjugate dienes such as butadiene and isoprene, non-conjugate polyenes such as 1,4-hexadiene, dicyclopentadiene and 5-vinyl-2-norbornene, acetylenes such as acetylene and methylacetylene and aldehydes such as formaldehyde may be copolymerized.

Monomers consumed by the polymerization may be supplied from optional places. For example, these monomers are supplied in a gaseous state to the reactor 1 from the supply port 3 through a supply line 10 in usual.

In the present invention, the saturated aliphatic hydrocarbon (A) is supplied to the inside of the reactor 1 together with at least one compound selected from the aliphatic amide (B) and the nonionic surfactant (C) constituted only of carbon, oxygen and hydrogen atoms besides the α-olefin.

Specific examples of the saturated aliphatic hydrocarbon include saturated aliphatic hydrocarbons having 4 to 20 carbon atoms such as n-butane, i-butane, n-pentane, i-pentane, hexane, heptane, octane, nonane, decane, dodecane, 2,2-dimethylpropane, 2,2-dimethylbutane, 2,3-dimethylbutane, 2,2,3-trimethylbutane, 2-methylpentane, 3-methylpentane, 2,2-dimethylpentane, 3,3-dimethylpentane, 2,3-dimethylpentane, 2,4-dimethylpentane, 2-methylhexane, 3-methylhexane, 4-methylhexane, 2,3-dimethylhexane, cyclopentane, cyclohexane, methylcyclopentane and dimethylcyclopentane. Among these hydrocarbons, typically hydrocarbons having 4 to 10 carbon atoms, specifically, i-pentane, n-pentane, i-butane, n-butane and the like are preferably used. These hydrocarbons may be used in combinations of two or more.

In the present invention, the saturated aliphatic hydrocarbon (A) as aforementioned may be supplied to the fluidized-bed reactor 1 in a vapor-liquid two-phase state to remove polymerization heat by the vaporization of the liquid phase saturated aliphatic hydrocarbon.

The concentration of the saturated aliphatic hydrocarbon in the reactor 1 is desirably adjusted to typically 1 mol % or more, preferably 1 to 25 mol %, more preferably 3 to 25 mol % and particularly preferably 5to 20 mol %. The adjustment of the concentration of the saturated aliphatic hydrocarbon in the fluidized-bed reactor 1 to the above range ensures that the amount of the chunk or sheet polymer to be produced when the reaction condition is rapidly changed or disturbed can be minimized even if the amount of at least one compound selected from the aliphatic amide (B) and the nonionic surfactant (C) constituted only of carbon, oxygen and hydrogen atoms is small and the polyolefin can be produced with high catalyst activity and also for a long operation time.

In the present invention, at least one compound selected from the aliphatic amide (B) and the nonionic surfactant (C) constituted only of carbon, oxygen and hydrogen atoms is supplied to a powder fluidized circumstance in the fluidized-bed reactor 1 together with the α-olefin and the saturated aliphatic hydrocarbon (A). A method of supplying these components may be any of continuous and intermittent supply method. Also, these components may be supplied to one powder fluidized circumstance or plural powder fluidized circumstances.

The aliphatic amide (B) is supplied to the powder fluidized circumstance such that it exists in an amount of $0.1 \times 10^{-6}$ to $400 \times 10^{-6}$ parts by weight, preferably $1 \times 10^{-6}$ to $200 \times 10^{-6}$ parts by weight and more preferably $5 \times 10^{-6}$ to $100 \times 10^{-6}$ parts by weight per one part by weight of the produced polyolefin. If the proportion of the aliphatic amide to be supplied exceeds the above range, this is economically disadvantageous and there is the case where polymerization activity drops, whereas if the proportion is less than the above range, there is the case where the fluidity of the polymer powder (polyolefin particle group) is deteriorated and the polymer powder is stuck to the wall surface of the polymerizing unit by static electricity.

As the aliphatic amide (B) used in the present invention, any material may be used without any limitation as far as it is used typically for antistatic agents and it is a conventionally known aliphatic amide. Those which are liquids at ambient temperature are preferable in view of handling ability. In the present invention, aliphatic amides having 4 to 40, preferably 8 to 30 and more preferably 12 to 20 carbon atoms are used.

As preferable examples of such an aliphatic amide, fatty acid diethanolamides represented by the following formula (I) are given.

$$(C_mH_{2m+1}CO)N(CH_2CH_2OH)_2 \qquad (I)$$

In the above formula, m indicating the number of carbon atoms of the alkyl group represented by $(C_mH_{2m+1})$ is in a range from 1 to 30, preferably 6 to 20 and more preferably 7 to 17.

Preferable and specific examples of the fatty acid diethanolamides include hexanoic acid diethanolamide, heptanoic acid diethanolamide, octanoic acid diethanolamide, nonanoic acid diethanolamide, decanoic acid diethanolamide, undecanoic acid diethanolamide, lauric acid diethanolamide, tridecylic acid diethanolamide, myristic acid diethanolamide, pentadecylic acid diethanolamide, palmitic acid diethanolamide, heptadecanoic acid diethanolamide and stearic acid diethanolamide. Among these compounds, particularly lauric acid diethanolamide is preferable. Examples of the aliphatic amide (B) other than fatty acid diethanolamides include fatty acid dimethanolamide, fatty acid monomethanolamide, fatty acid monoethanolamide and fatty acid monopropanolamide. These aliphatic amides may be used alone or in combinations of two or more.

In the process for producing a polyolefin according to present invention, the nonionic surfactant (C) constituted only of carbon, oxygen and hydrogen atoms may be used to achieve stable and continuos production of a polyolefin even when reaction conditions are suddenly changed. Specific examples of the nonionic surfactant (C) constituted only of carbon, oxygen and hydrogen atoms include polyoxyethylene lauryl ether, polyoxyethylene oleyl ether, polyoxyalkylene lauryl ether, polyoxyethylene isodecyl ether, polyoxyethylene alkyl ether, polyoxyalkylene alkyl ether, polyoxyethylene castor oil, polyoxyethylene hydrogenated castor oil, polyoxyethylene styrenated phenyl ether, polyoxyethylene oleate, polyoxyethylene distearate, polyoxyalkylene glycol, sorbitan sesquioleate, sorbitan monooleate, sorbitan monostearate, sorbitan monolaurate, polyoxyethylenesorbitan monolaurate, polyoxyethylenesorbitan monostearate, polyoxyethylenesorbitan monooleate, polyoxyethylene lanolin alcohol ether, polyoxyethylenelanoline fatty acid ester, polyoxyethylene alkylamine ether, polyethylene glycol alkyl ether, polyethylene glycol monolaurate, polyethylene glycol monostearate, polyethylene glycol monooleate, polyethylene glycol sorbitan monolaurate and polyethylene glycol sorbitan monooleate. These nonionic surfactants may be used alone or in combinations of two or more.

In the present invention, a polyoxyalkylene glycol is preferable as the nonionic surfactant (C) constituted of carbon, oxygen and hydrogen atoms. Although a polyethylene oxide or polypropylene oxide may be used in the chemical structure of the nonionic surfactant without any limitation, polyoxyalkylene glycols (another name: polyethylene oxide/polypropylene oxide copolymer) represented by the following formula (II) are preferable in the present invention.

In the formula (II), the sum (m+p) of m and p which respectively represent the number of the repeat unit represented by [CH$_2$CH$_2$O] is in a range from 2 to 40, preferably 4 to 20 and more preferably 4 to 15. The ratio (m/p) of these repeat units is 0.1 to 10 and preferably 0.5 to 5. On the other hand, n which represents the number of the repeat unit represented by [CH$_2$CH(CH$_3$)O] is in a range from 2 to 50, preferably 10 to 50 and more preferably 20 to 50.

The nonionic surfactant constituted only of carbon, oxygen and hydrogen atoms is made to exist in an amount of $0.1 \times 10^{-6}$ to $200 \times 10^{-6}$ parts by weight, preferably $0.1 \times 10^{-6}$ to $100 \times 10^{-6}$ parts by weight and more preferably $0.1 \times 10^{-6}$ to $50 \times 10^{-6}$ parts by weight per one part by weight of the produced polyolefin to produce a polyolefin.

When making the nonionic surfactant (C) and the aliphatic amide (B) to coexist, the ratio [(C)/(B)] of the nonionic surfactant to the aliphatic amide is preferably 1/20 to 1/3 (ratio by weight) and more preferably 1/10 to 1/5 (ratio by weight).

In the case of using both the aliphatic amide (B) and the nonionic surfactant (C) constituted only of carbon, oxygen and hydrogen atoms when producing the polyolefin, the both compounds may be added either independently or by mixing them with each other. However, the amount of each compound to be added is easily adjusted more exactly in the case of the independent addition, namely, separate addition of each compound and therefore the independent addition is preferably adopted. As a method of addition, any of addition in the form of a raw liquid and addition in the form of a solution may be adopted corresponding to the specification of supply equipment and the amount of these compounds to be added.

When using the aliphatic amide (B) and the nonionic surfactant (C) constituted only of carbon, oxygen and hydrogen atoms in such a state that these compounds are diluted with a solvent, the saturated aliphatic hydrocarbon (A) given as the above specific examples may be used without any limitation. Among these examples, saturated aliphatic hydrocarbons having 5 to 12 carbons such as pentane, hexane, heptane, octane, decane and dodecane are preferable. Or, (D) an unsaturated aliphatic hydrocarbon having 4 to 20 carbon atoms and a double bond at its terminal as described later may be used as the solvent for dilution.

When the aliphatic amide (B) and the nonionic surfactant (C) constituted only of carbon, oxygen and hydrogen atoms are diluted with the aliphatic hydrocarbon, the concentration of these compounds is in a range from typically 0.5 to 80% by weight and preferably 0.5 to 30% by weight though not particularly limited. Here, the diluted state implies such states that the aliphatic amide (B) and/or the nonionic surfactant (C) constituted only of carbon, oxygen and hydrogen atoms and the aliphatic hydrocarbon are mixed with each other or dispersed in each other. Specifically, all states including a solution or a dispersion, to state in more detail, a solution, a suspension (suspended solution) or an emulsion (emulsified solution) are implied.

Examples of the unsaturated aliphatic hydrocarbon (D) (abbreviated as "α-olefin comonomer" as the case may be in the following explanations) having 4 to 20 carbon atoms and a double bond at its terminal may include 1-hexene, 1-heptene, 1-octene, 1-nonene and 1-decene. Among these compounds, 1-hexene and 1-octene are preferably used.

When the aliphatic amide (B) and/or the nonionic surfactant (C) constituted only of carbon, oxygen and hydrogen atoms are used in the state of a solution of the aliphatic hydrocarbon solution, the aliphatic hydrocarbon has not only a function as a solvent but also a function as a component participating in the polymerization and therefore preferably has high purity from the viewpoint of preventing a reduction in catalyst activity. It is preferable that the purity of the hydrocarbon used in a normal operation be 95% or more and the hydrocarbon containing components other than the hydrocarbon in an amount of 200 ppm or less be used. It is more preferable that the purity of the hydrocarbon used in a normal operation be 97% or more and the hydrocarbon containing components other than the hydrocarbon in an amount of 100 ppm or less be used. Also, it is desirable to carry out a foaming operation and a deoxidation operation after preparing the solution, followed by supplying the solution to the polymerization system. Also, a method is preferably adopted in which the solution is supplied with stirring it continuously or intermittently to keep the solution concentration uniform.

As to the polymerization in the fluidized bed 5, the polymerization pressure is in a range from typically 0.098 to 9.8 MPa and preferably 0.19 to 3.9 MPa and the polymerization temperature $T_R$ is preferably a temperature close to the dew point of the vapor phase in the reactor 1, more preferably a temperature less than the dew point +20° C., still more preferably a temperature less than the dew point +10° C. and particularly preferably a temperature less than the dew point +5° C., though these conditions differ depending on the type and copolymerization ratio of the α-olefin, the amount of the saturated aliphatic hydrocarbon, the amount of the aliphatic amide and gas flow rate.

The above polymerization may be carried out in the presence of molecular-weight regulator such as hydrogen according to the need. The molecular-weight regulator may be supplied from an optional place, for example, a line 10. Also, the polymerization may be carried out in two or more stages differing in reaction condition.

The polyolefin produced in the above manner is withdrawn continuously or intermittently from the lower portion of the fluidized-bed reactor 1 through the line 6 and then, typically dried. The saturated aliphatic hydrocarbon as aforementioned is non-polymerizable and is not consumed by the polymerization. The saturated aliphatic hydrocarbon gasified in the fluidized bed (reaction system) 5 is withdrawn from the line 4 together with unreacted polymerization monomers and typically circulated to the reactor 1 after cooled in usual. A part of the liquid saturated aliphatic hydrocarbon and the like are dissolved and contained in the produced polyolefin and then withdrawn from the reactor 1. Therefore, the reduced content may be supplied from a desired place, for example, the line 10.

The gas discharged from the fluidized-bed reactor 1 as aforementioned through the line 4 is typically cooled in a heat exchanger 11 and then circulated to the fluidized-bed reactor 1.

When circulating the discharged gas to the fluidized-bed reactor 1 in this manner, a part of the discharged gas may be purged from, for example, a line 8. The gas discharged from the reactor 1 typically contains unreacted polymerizing monomers, hydrogen gas, inert gas and the like besides the saturated aliphatic hydrocarbon.

In the present invention, when the discharged gas is circulated to the reactor in this manner, it is cooled in the heat exchanger 11 and circulated as it is from a line 9 to the reactor 1 through the supply port 3 as a fluidizing gas as shown in FIG. 1. The gas cooled in the heat exchanger 11 may be either in a gaseous state or in a vapor-liquid mixed state containing a condensed liquid.

Figure 2:
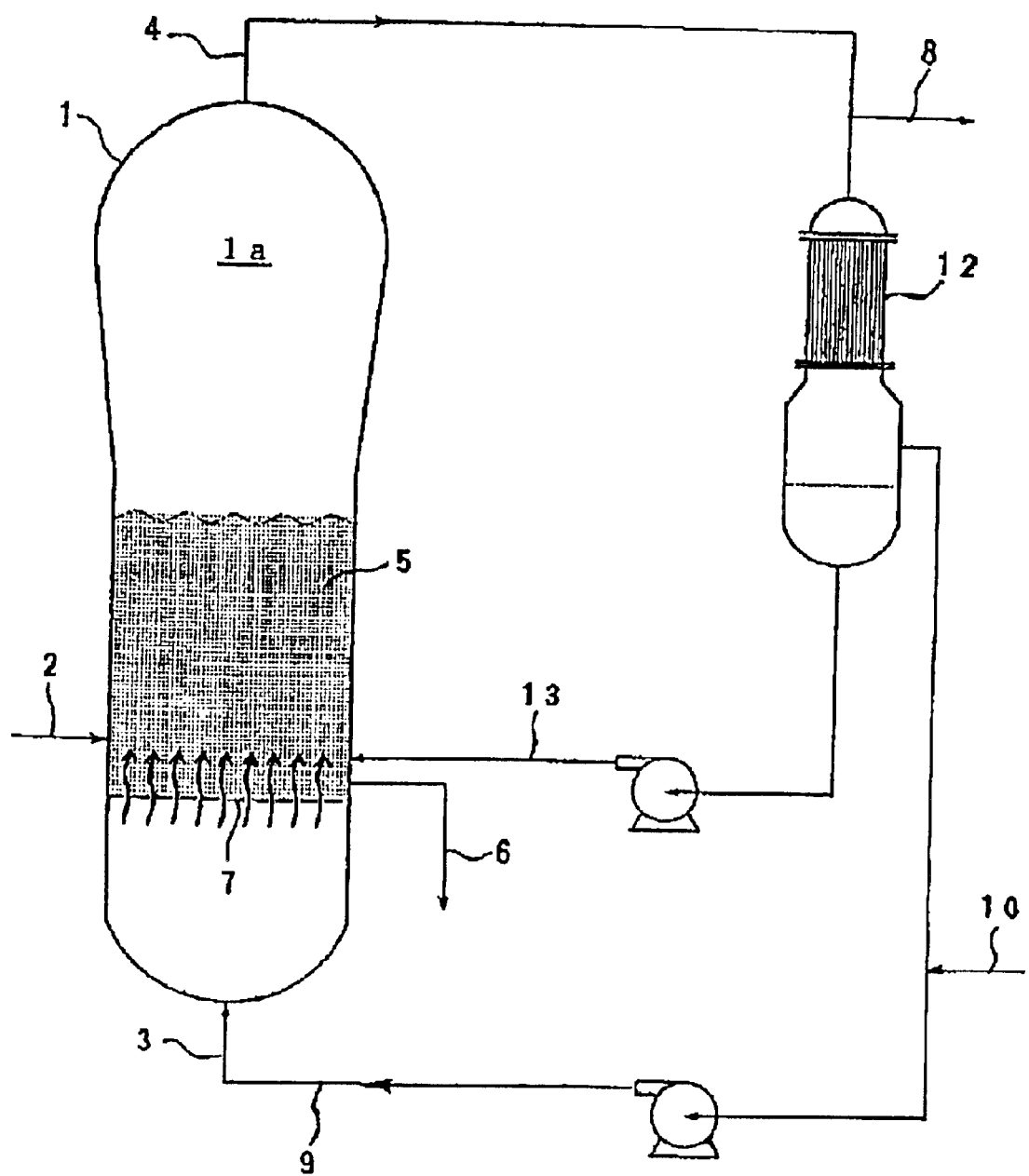
FIG. 2 is a schematic explanatory view of another example of a polymerization process in which the polymerization of an α-olefin is carried out in one stage in a process for producing a polyolefin according to the present invention.

Also, a method may be adopted in which, as shown in FIG. 2, the discharged gas is cooled using, for example, a heat exchanger 12 having a vapor-liquid separating function, the saturated aliphatic hydrocarbon which is put in a vapor-liquid mixed state is subjected to vapor-liquid separation, the separated gas phase is circulated to the fluidized-bed reactor 1 from, for example, the line 9 and the liquid phase is supplied directly to the lower portion of the fluidized bed (reaction system) 5 from, for example, a line 13. It should to be noted that in FIG. 2, the same symbols as those in FIG. 1 show the same parts as those in FIG. 1

In the present invention, the molecular weight of the resulting polyolefin may be regulated by changing polymerization conditions such as polymerization temperature or by controlling the amount of hydrogen (molecular weight regulator) to be used.

When, as mentioned above, the liquid saturated aliphatic hydrocarbon is introduced to polymerize or copolymerize the α-olefin, polymerization heat can be removed in an efficient manner and the sheeting and melting of the polymer caused by local heating are scarcely caused.

Also, the produced polyolefin particle contains moisture consisting of the saturated aliphatic hydrocarbon and is therefore scattered with difficulty, whereby operability is improved.

Next, in the case of carrying out the polymerization in two or more stages, explanations will be furnished taking as an example, a multistage vapor phase polymerization apparatus having two vapor phase fluidized-bed reactors which are serially connected with each other.

Figure 3:
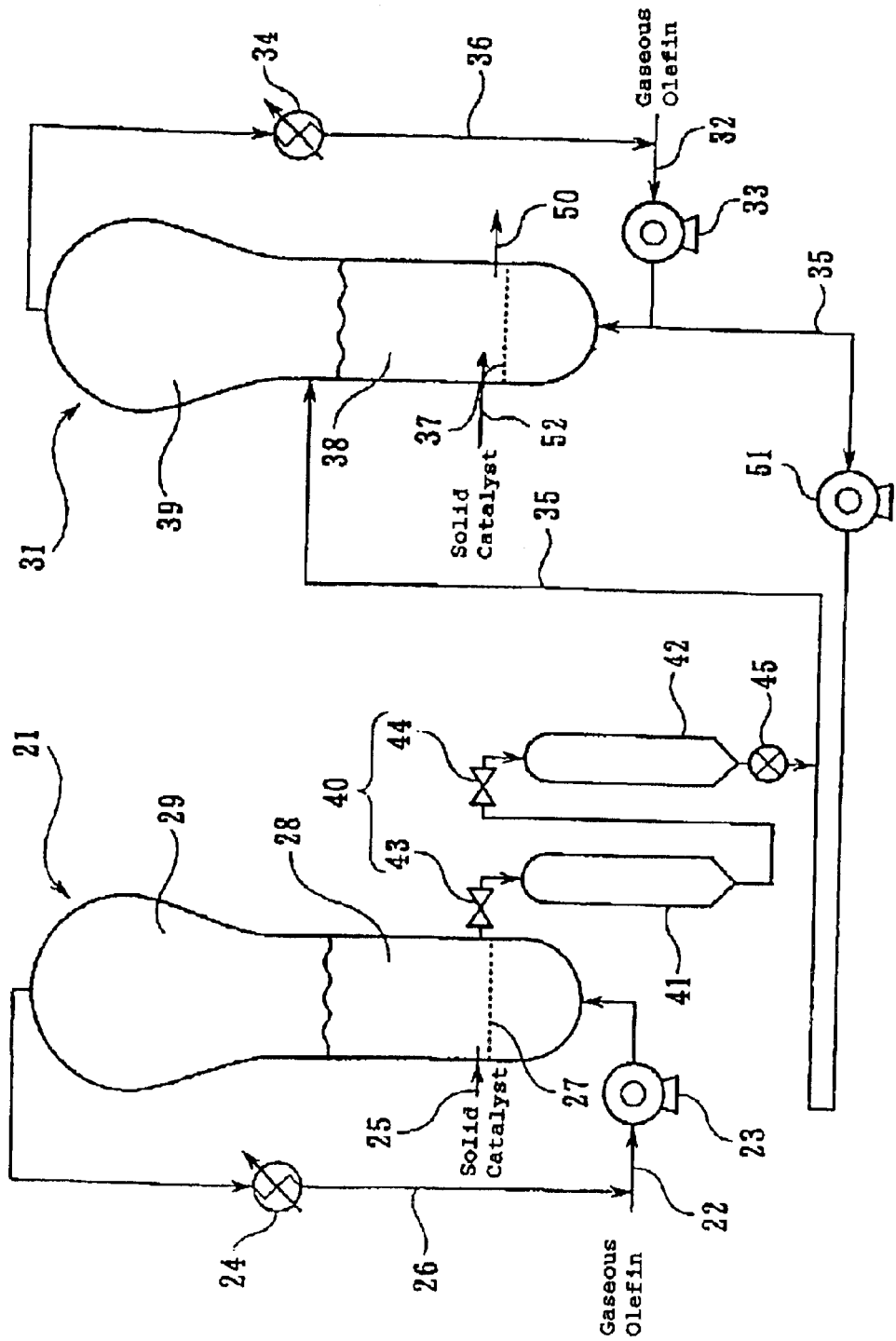
FIG. 3 is a schematic explanatory view of one example of a polymerization process in which the polymerization of an α-olefin is carried out in two stages in a process for producing a polyolefin according to the present invention.

The multistage vapor phase polymerization apparatus comprises a first fluidized-bed reactor 21 and a second fluidized-bed reactor 31 which are serially connected with each other as shown in, for example, FIG. 3.

Specifically, in the first fluidized-bed reactor 21, it is so designed that a transition metal compound catalyst such as a metallocene type carrying catalyst (solid catalyst) is supplied from a supply line 25 and also, gas (fluidizing gas) containing the gaseous olefin (polymerization monomers), the saturated aliphatic hydrocarbon (A) at least one compound selected from the aliphatic amide (B) and the nonionic surfactant (C) constituted only of carbon, oxygen and hydrogen atom is supplied from the bottom of the first fluidized-bed reactor 21 from a supply line 22 through a blower 23. The supplied fluidizing gas is blown into a fluidized bed 28 (reaction system) through a distributing plate 27 made of a perforated plate or the like disposed in the vicinity of the bottom of the first fluidized-bed reactor 21 and discharged from the upper part of the fluidized-bed reactor 21, and thus the fluidizing gas passes through the inside of the fluidized-bed reactor 21. The solid particles (the solid catalyst and the produced polymer) were kept in a fluidizing state by the gas flow of the gas passing through the inside of the fluidized-bed reactor 21, whereby the fluidized bed 28 is formed.

Then, the produced polymer particles are withdrawn continuously or intermittently and subjected to solid-vapor separation using solid-vapor separators 41 and 42. At this time, valves 43 and 44 are properly opened and shut under control. The polymer particles withdrawn in this manner are discharged in a transport line 35 by the action of the valve 45 and fed to the second fluidized-bed reactor 31 through the transport line 35.

Also, the unreacted gaseous olefin, saturated aliphatic hydrocarbon (A), at least one compound selected from the aliphatic amide (B) and the nonionic surfactant (C) constituted only of carbon, oxygen and hydrogen atoms and the like which are passed through the fluidized bed 28 are decelerated in their flow rates in a decelerating zone 29 disposed on the upper part of the first fluidized-bed reactor 21 and discharged out of the first fluidized-bed reactor 21 through a gas discharge port disposed on the upper part of the first fluidized-bed reactor 21.

The unreacted gaseous olefins, saturated aliphatic hydrocarbon (A), at least one compound selected from the aliphatic amide (B) and the nonionic surfactant (C) constituted only of carbon, oxygen and hydrogen atoms and the like which are discharged from the first fluidized-bed reactor 21 are cooled in a heat exchanger (cooling unit) 24 through a circulating line 26, joined the supply gas in the supply line 22 and supplied continuously again to the inside of the fluidized bed 28 in the first fluidized-bed reactor 21 by a blower 23. In the heat exchanger 24, the circulating gas is typically cooled to a temperature close to the dew point of the gas. The dew point of the gas means the temperature at which a liquid condensate starts generating in the gas. When the circulating gas which is cooled to a temperature lower than the dew point is supplied to the fluidized bed 28, reaction heat can be removed by the latent heat of vaporization of the liquid condensate to thereby improve heat-removal efficiency in the fluidized bed 28. It should to be noted that when circulating the circulating gas to the fluidized-bed reactor 21, a part of the circulating gas may be purged from an optional place of the circulating line 26.

On the other hand, the polymer particles withdrawn from a discharge line 40 of the first fluidized-bed reactor 21 through the solid-vapor separators 41 and 42 are fed to the second fluidized-bed reactor 31 through the transport line 35. The transport line 35 is branched from the supply line 32 and the other end of the transport line 35 is connected to the upper portion of the second fluidized-bed reactor 31. The pressure of the gas containing the olefins, the saturated aliphatic hydrocarbon (A) and at least one compound selected from the aliphatic amide (B) and the nonionic surfactant (C) constituted only of carbon, oxygen and hydrogen atoms and fed from the supply line 32 is raised by a pressure-rise means such as a centrifugal blower 51, also the polymer particles withdrawn from the first fluidized-bed reactor 21 is made to be entrained in this gas to transport the polymer particles and then introduced into the second fluidized-bed reactor 31. Also, new gaseous olefins (polymerizing monomers), the saturated aliphatic hydrocarbon (A) and at least one compound selected from the aliphatic amide (B) and the nonionic surfactant (C) constituted only of carbon, oxygen and hydrogen atoms are supplied to the second fluidized-bed reactor 31 from the supply line 32 through a blower 33 and the transport line 35 and also supplied as a fluidizing gas to the bottom of the second fluidized-bed reactor 31. It should to be noted that although a new catalyst is not supplied to the second fluidized-bed reactor 31 in general, a new solid catalyst may be supplied to a desired place of the fluidized-bed reactor through, for example, a line 52 or the transport line 35 according to the need.

The fluidizing gas supplied from the bottom of the second fluidized-bed reactor 31 is blown into a fluidized bed 38 (reaction system) through a distributing plate 37 made of a perforated plate or the like disposed in the vicinity of the bottom of the second fluidized-bed reactor 31 and discharged from the upper part of the fluidized-bed reactor 31, and thus passed through the fluidized-bed reactor 31. The gas stream of the gas passing through the fluidized-bed reactor 31 keeps the solid particles (the aforementioned polymer particles and the produced polymer) in a fluidizing state to thereby form the fluidized bed 38. At this time, a copolymerization reaction is run in the fluidized bed 38.

Then, the polymer particles obtained in the second fluidized-bed reactor 31 are withdrawn continuously or intermittently from a discharge line 50.

Also, the unreacted gaseous olefin, the saturated aliphatic hydrocarbon (A), at least one compound selected from the aliphatic amide (B) and the nonionic surfactant (C) constituted only of carbon, oxygen and hydrogen atoms and the like which are passed through the fluidized bed 38 are decelerated in their flow rates in a decelerating zone 39 disposed on the upper part of the second fluidized-bed reactor 31 and discharged out of the second fluidized-bed reactor 31 through a gas discharge port disposed on the upper part of the second fluidized-bed reactor 31.

The unreacted gaseous olefins, the saturated aliphatic hydrocarbon (A), at least one compound selected from the aliphatic amide (B) and the nonionic surfactant (C) constituted only of carbon, oxygen and hydrogen atoms and the like discharged from the second fluidized-bed reactor 31 are cooled in a heat exchanger (cooling unit) 34 through a circulating line 36, joined the supply gas in the supply line 32 and supplied continuously again to the inside of the fluidized bed 38 in the second fluidized-bed reactor 31 by a blower 33. In the heat exchanger 34, the circulating gas is typically cooled to a temperature close to the dew point of the gas. When the circulating gas which is cooled to a temperature lower than the dew point is supplied to the fluidized bed 38, reaction heat can be removed by the latent heat of vaporization of the liquid condensate to thereby improve heat-removal efficiency in the fluidized bed 38. It should to be noted that when circulating the circulating gas to the second fluidized-bed reactor 31, a part of the circulating gas may be purged from an optional place of the circulating line 36.

In the first fluidized-bed reactor 21, as mentioned above, the fluidizing gas is passed through the fluidized bed 28 at such a flow rate that the fluidized bed 28 can be kept in a fluidizing state. In the second fluidized-bed reactor 31, the fluidizing gas is passed through the fluidized bed 38 at such a flow rate that the fluidized bed 38 can be kept in a fluidizing state.

Specifically, the flow rate of the gas introduced from the bottom of each reactor through the supply lines 22 and 32 is about $3U_{mf}$ to $50U_{mf}$ and preferably about $5U_{mf}$ to $30U_{mf}$ where $U_{mf}$ is the minimum fluidizing rate of the fluidized bed. It is possible to stir the fluidized bed mechanically, for example, by using various stirrers such as an anchor type stirrer, screw type stirrer and ribbon type stirrer.

Although the above explanations were furnished as to a multistage vapor phase polymerization apparatus consisting of two fluidized-bed reactors, namely the first fluidized bed reactor 21 and the second fluidized-bed reactor 31 which are serially connected to each other, even a multistage vapor phase apparatus consisting of three or more fluidized-bed reactors can be structured in the same manner.

Using a multistage vapor phase polymerization apparatus as aforementioned, one or two or more α-olefins and preferably ethylene and at least one α-olefin having 3 to 20 carbon atoms which are supplied to the inside of the fluidized-bed reactor are polymerized in the fluidized bed and in reactors in the subsequent stages including the second stage, copolymerization is carried out in the presence of the copolymer produced in the previous stage. Although no particular limitation is imposed on the type of polymer to be produced in each reactor, it is preferable to produce a high-molecular weight polyolefin, for example, a high-molecular weight polyethylene in at least one reactor and a low-molecular weight polyolefin, for example, a low-molecular weight polyethylene in other reactors.

With regard to the ratio of one or two or more α-olefins to be supplied to the fluidized-bed reactor, though it differs depending on the type (composition) of polyolefin to be finally intended, when one α-olefin is supplied in one mol, other α-olefins are supplied in an amount of typically 0.015 to 0.15 mol and preferably 0.02 to 0.08 mol. For example, in the case of using ethylene and an α-olefin having 3 to 20 carbon atoms as two α-olefins, the ratio of ethylene to the α-olefin having 3 to 20 carbon atoms is as follows though it differs depending on the type (composition) of ethylene/α-olefin copolymer to be finally intended: in the case of a linear low-density polyethylene (LLDPE) composition, the α-olefin having 3 to 20 carbon atoms is supplied in an amount of typically 0.015 to 0.15 mol and preferably 0.02 to 0.08 mol to one mol of ethylene.

Also, in the present invention, polyenes and the like may be copolymerized together with the above olefins according to the need. For example, conjugate dienes such as butadiene and isoprene or non-conjugate dienes such as 1,4-hexadiene, dicyclopentadiene and 5-vinyl-2-norbornene may be copolymerized.

In the present invention, the above copolymerization is carried out in the presence of at least one saturated aliphatic hydrocarbon and preferably in the presence of at least one gaseous saturated aliphatic hydrocarbon having 2 to 10 carbon atoms.

The aforementioned saturated aliphatic hydrocarbon (A) is a non-polymerizable hydrocarbon and is never consumed in the polymerization once it is supplied to the fluidized bed. The saturated aliphatic hydrocarbon contained in the gas discharged from the fluidized-bed reactor is circulated to the fluidized-bed reactor through a circulating line.

This saturated aliphatic hydrocarbon may be introduced in a gaseous state. However, it is rather preferable to introduce the saturated aliphatic hydrocarbon in such a condition that a part thereof is put in a liquid state. The saturated aliphatic hydrocarbon introduced from the supply line is preferably present in a gaseous state in the fluidized bed from the viewpoint of uniform polymerization. However, at least a part of the saturated aliphatic hydrocarbon may be present in a mist state. These conditions are properly set based on the balance between uniformity and heat removal. Although the saturated aliphatic hydrocarbon may be introduced from the supply line in a mist state or the like, it is preferably introduced into the supply line of the fluidized-bed reactor.

Also, the saturated aliphatic hydrocarbon (A) is typically introduced into the fluidized-bed reactor through the supply line together with the α-olefin and at least one compound selected from the aliphatic amide (B) and the nonionic surfactant (C) constituted only of carbon, oxygen and hydrogen atoms as mentioned above. However, the saturated aliphatic hydrocarbon may be supplied from an optional place of the fluidized-bed reactor and may be supplied directly to the fluidized bed from, for example, the catalysts supply line.

In the fluidized bed, the polymerization temperature when polymerizing at least one α-olefin with introducing the saturated aliphatic hydrocarbon as aforementioned is typically 20 to 130° C., preferably 50 to 120° C. and more preferably 70 to 110° C. though no particular limitation is imposed on the polymerization temperature.

The polymerization pressure is in a range from typically 0.098 to 9.8 MPa and preferably 0.19 to 3.9 MPa though it differs depending on the type and proportion of the α-olefin to be copolymerized, the concentration of the saturated aliphatic hydrocarbon (A), the concentration of at least one compound selected from the aliphatic amide (B) and the nonionic surfactant (C) constituted only of carbon, oxygen and hydrogen atoms, the fluidized state of the fluidized bed and the like.

The above polymerization may be carried out in the presence of a molecular weight regulator such as hydrogen according to the need. The molecular weight regulator such as hydrogen may be supplied from an optional place of the fluidized-bed reactor, for example, the supply line.

In the present invention, the molecular weight of the copolymer may be adjusted by changing the polymerization condition such as polymerization temperature or may be adjusted by controlling the amount of hydrogen (molecular weight regulator) to be used.

In the present invention, the (co) polymerization of the α-olefin as aforementioned may be carried out using a wide range of catalysts known as catalysts for olefin polymerization such as Ziegler type catalysts, Phillips type chromium oxide catalysts or metallocene catalysts. Among these catalysts, particularly a metallocene type catalyst is preferably used.

Specifically, the metallocene type catalyst preferably used in the present invention comprises, for example, (E) a metallocene compound of a transition metal selected from the IV, V and VI groups in the periodic table, and (F) at least one compound selected from (F-1) an organic aluminum oxy compound, (F-2) an organic aluminum compound and (F-3) a compound which react with the metallocene compound (E) to form an ion pair.

The metallocene compound (E) of a transition metal selected from the IV, V and VI groups in the periodic table is specifically represented by the following formula (i).

$$ML_x \quad (i)$$

wherein M represents a transition metal selected from Zr, Ti, Hf, V, Nb, Ta and Cr, L represents a ligand coordinated with the transition metal wherein at least one L is a ligand having a cyclopentadienyl structure and Ls other than the ligand having a cyclopentadienyl structure is a hydrogen atom, a halogen atom, a hydrocarbon group having 1 to 12 carbon atoms, an alkoxy group, an aryloxy group, a trialkylsilyl group or a $SO_3R$ group (where R is a $C_{1-8}$ hydrocarbon group which may have a substituent such as a halogen group) and x represents the atomic value of the transition metal.

As the ligand having a cyclopentadienyl structure, alkyl substituted cyclopentadienyl groups such as a cyclopentadienyl group, methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylethylcyclopentadienyl group, propylcyclopentadienyl group, methylpropylcyclopentadienyl group, butylcyclopentadienyl group, methylbutylcyclopentadienyl group and hexylcyclopentadienyl group, indenyl groups and 4,5,6,7-tetrahydroindenyl groups and fluorenyl groups may be exemplified. These groups may be substituted with a halogen atom, trialkylsilyl group or the like. Among these groups, alkyl substituted cyclopentadienyl groups are particularly preferable.

Specific examples of the ligand other than the ligands having a cyclopentadienyl structure are as follows. Examples of the halogen include fluorine, chlorine, bromine and iodine. Examples of the hydrocarbon group having 1 to 12 carbon atoms include alkyl groups such as a methyl group, ethyl group, propyl group, isopropyl group and butyl group, cycloalkyl groups such as a cyclopentyl group and cyclohexyl group, aryl groups such as a phenyl group and tolyl group and aralkyl groups such as a benzyl group and a neophyl group. Examples of the alkoxy group include a methoxy group, ethoxy group and butoxy group. Examples of the aryloxy group include a phenoxy group. Examples of the $SO_3R$ group include a p-toluene sulfonate group, methane sulfonate group and trifluoromethane sulfonate group.

In the case where the compound represented by the above formula (i) has two or more groups having a cyclopentadienyl structure, two groups having a cyclopentadienyl structure among these groups may be combined with each other through an alkylene group such as ethylene or propylene, substituted alkylene group such as isopropylidene or diphenylmethylene, silylene group or substituted silylene group such as a dimethylsilylene group, diphenylsilylene group or methylphenylsilylene group.

The metallocene compounds containing such a ligand having a cyclopentadienyl structure are represented more specifically by the following formula (ii), for example, when the valence of the transition metal is 4.

$$R^2{}_k R^3{}_l R^4{}_m R^5{}_n M \quad (ii)$$

wherein M represents the foregoing transition metal, $R^2$ represents a group (ligand) having a cyclopentadienyl structure, $R^3$, $R^4$ and $R^5$ represent groups having a cyclopentadienyl structure or other groups as aforementioned, k denotes an integer of 1 or more and k+l+m+n=4.

In the present invention, metallocene compounds represented by the formula (ii) in which at least two, for example, $R^2$ and $R^3$, among $R^2$, $R^3$, $R^4$ and $R^5$ are groups (ligands) having a cyclopentadienyl structure are preferably used. These groups having a cyclopentadienyl structure may be combined with each other through an alkylene group, substituted alkylene group, silylene group or substituted silylene group.

Examples of the metallocene compounds as aforementioned, when, specifically, M is zirconium, include bis(cyclopentadienyl)zirconium dichloride, bis(cyclopentadienyl)zirconium dibromide, bis(cyclopentadienyl)dimethylzirconium, bis(cyclopentadienyl)diphenylzirconium, bis(cyclopentadienyl)dibenzylzirconium, bis(cyclopentadienyl)zirconium bis(methanesulfonate), bis(cyclopentadienyl)zirconium bis(p-toluenesulfonate), bis(cyclopentadienyl)zirconium trifluoromethanesulfonate), bis(methylcyclopentadienyl)zirconium dichloride, bis(dimethylcyclopentadienyl)zirconium dichloride, bis(ethylcyclopentadienyl)zirconium dichloride, bis(methylethylcyclopentadienyl)zirconium dichloride, bis(propylcyclopentadienyl)zirconium dichloride, bis(methylpropylcyclopentadienyl)zirconium dichloride, bis(butylcyclopentadienyl)zirconium dichloride, bis(methylbutylcyclopentadienyl)zirconium dichloride, bis(trimethylcyclopentadienyl)zirconium dichloride, bis(tetramethylcyclopentadienyl)zirconium dichloride, bis(pentamethylcyclopentadienyl)zirconium dichloride, bis(indenyl) zirconium dichloride, bis(indenyl)zirconium dibromide, bis(4,5,6,7-tetrahydroindenyl)zirconium dichloride, bis(fluorenyl)zirconium dichloride, ethylenebis(indenyl)zirconium dichloride, ethylenebis(indenyl) zirconium dibromide, ethylenebis(indenyl) dimethylzirconium, isopropylidene(cyclopentadienyl-fluorenyl)zirconium dichloride, isopropylidene (cyclopentadienyl-methylcyclopentadienyl)zirconium dichloride, dimethylsilylenebis(cyclopentadienyl)zirconium dichloride, dimethylsilylenebis(methylcyclopentadienyl) zirconium dichloride, dimethylsilylenebis(dimethylcyclopentadienyl)zirconium dichloride, dimethylsilylenebis(trimethylcyclopentadienyl)zirconium dichloride, dimethylsilylenebis(indenyl)zirconium dichloride, dimethylsilylenebis(2-methylindenyl)zirconium dichloride, dimethylsilylenebis(2-methyl,4-isopropylindenyl)zirconium dichloride, dimethylsilylene (cyclopentadienyl-fluorenyl)zirconium dichloride, diphenylsilylenebis(indenyl)zirconium dichloride and methylphenylsilylenebis(indenyl)zirconium dichloride.

It should to be noted that in the above examples, the di-substituted form of a cyclopentadienyl ring include a 1,2-and 1,3-substituted forms and the tri-substituted form of a cyclopentadienyl ring include 1,2,3-and 1,2,4-substituted forms. Also, the alkyl groups such as propyl and butyl include isomers such as n-, i-, sec- and tert-isomers.

Also, compounds obtained by substituting titanium, hafnium, vanadium, niobium, tantalum or chromium for zirconium in the zirconium metallocene compounds as mentioned above may be exemplified.

In the present invention, as the metallocene compound (E), zirconium metallocene compounds having a ligand containing at least two cyclopentadienyl structures are preferably used. These metallocene compounds may be used in combinations of two or more.

The organic aluminum oxy compound (F-1) to be used in the present invention may be conventionally known benzene-soluble aluminoxane and also benzene-insoluble organic aluminum oxy compounds as disclosed in the publication of Japanese Patent Application Laid-Open No. 2-276807.

This aluminoxane may contain a small amount of organic metal components. Also, a material obtained by removing solvents and unreacted organic aluminum compounds from a recovered aluminoxane solution by distillation may be used by redissolving it in a solvent.

Given as specific examples of the organic aluminum compound used in the production of aluminoxane are those described later as the organic aluminum compound (F-2). These compounds may be used in combinations of two or more. Among these compounds, trialkylaluminum and tricycloalkylaluminum are particularly preferable.

Also, the benzene-insoluble organic aluminum oxy compound used in the present invention contains an Al component soluble in 60° C. benzene in an amount of 10% or less, preferably 5% or less and particularly preferably 2% or less as converted into an Al atom and is insoluble or sparingly soluble in benzene.

The solubility of such an organic aluminum oxy compound in benzene is found in the following manner. Specifically, the organic aluminum oxy compound corresponding to Al of 100 mg atoms is suspended in 100 ml of benzene and then mixed at 60° C. for 6 hours with stirring. The suspension is subjected to filtration using a G-5 glass filter with a jacket at 60° C. under heating and the solid part separated on the filter is washed with 50 ml of 60° C. benzene four times. Then, the existential amount (x mmol) of Al atoms existing in all the filtrates is measured to determine the solubility (x%) of the organic aluminum oxy compound. In the present invention, the organic aluminum oxy compounds (F-1) may be used in combinations of two or more.

The organic aluminum compound (F-2) used in the present invention is represented by, for example, the following formula (iii).

$$R^1{}_n AlX_{3-n} \qquad (iii)$$

wherein $R^1$ represents a hydrocarbon group having 1 to 12 carbon atoms, X represents a halogen atom or a hydrogen atom and n denotes a number from 1 to 3.

In the above formula (iii), $R^1$ represents a hydrocarbon group having 1 to 12 carbon atoms, for example, an alkyl group, cycloalkyl group or aryl group and specifically a methyl group, ethyl group, n-propyl group, isopropyl group, isobutyl group, pentyl group, hexyl group, octyl group, cyclopentyl group, cyclohexyl group, phenyl group and tolyl group.

Specific examples of the organic aluminum compound (F-2) like this may include trialkylaluminums such as trimethylaluminum, triethylaluminum, triisopropylaluminum and triisobutylaluminum; alkenylaluminums such as isopulenylaluminum; dialkylaluminum halides such as dimethylaluminum chloride, diethylaluminum chloride, diisopropylaluminum chloride and diisobutylaluminum chloride; alkylaluminum sesquihalides such as methylaluminum sesquichloride, ethylaluminum sesquichloride and isopropylaluminum sesquichloride; alkylaluminum dihalides such as methylaluminum dichloride, ethylaluminum dichloride and isopropylaluminum dichloride; and alkylaluminum hydrides such as diethylaluminum hydride and diisobutylaluminum hydride.

Also, as the organic aluminum compound (F-2), compounds represented by the following formula (iv) may be used.

$$R^1{}_n AlY_{3-n} \qquad (iv)$$

wherein $R^1$ is the same as above, Y represents an —$OR^2$ group, an —$OSiR^3_3$ group, an —$OAlR^4_2$ group, a —$NR^5_2$ group, a —$SiR^6_3$ group or a —$N(R^7)AlR^8_2$ group, n denotes a number of 1 to 2, $R^2$, $R^3$, $R^4$ and $R^8$ respectively represent a methyl group, an ethyl group, an isopropyl group, an isobutyl group, a cyclohexyl group or a phenyl group, $R^5$ represents a hydrogen atom, a methyl group, an ethyl group, an isopropyl group, a phenyl group, a trimethylsilyl group or the like and $R^6$ and $R^7$ respectively represent a methyl group or an ethyl group.

Among these compounds, trialkylaluminum is preferable and triisobutylaluminum is particularly preferable. These organic aluminum compounds (F-2) may be used in combinations of two or more.

Examples of the compound (F-3) which reacts with the metallocene compound CE) to form an ion pair may include Lewis acids, ionic compounds and carborane compounds described in each publication of Japanese Patent Application Laid-Open Nos. 1-501950, 1-502036, 3-179005, 3-179006, 3-207703 and 3-207704 and in the specification of US-547718.

Examples of the Lewis acid include triphenylboron, tris(4-fluorophenyl)boron, tris(p-tolyl)boron, tris(o-tolyl)boron, tris(3,5-dimethylphenyl)boron, tris(pentafluorophenyl) boron, $MgCl_2$, $Al_2O_3$ and $SiO_2$—$Al_2O_3$.

Examples of the ionic compound include triphenylcarbeniumtetrakis(pentafluorophenyl) borate, tri-n-butylammoniumtetrakis(pentafluorophenyl) borate, N,N-dimethylaniliniumtetrakis(pentafluorophenyl) borate and ferroceniumtetra(pentafluorophenyl) borate.

Examples of the carborane compound include dodecaborane, 1-carbaundecaborane, bis-n-butylammonium (1-carbedodeca) borate, tri-n-butylammonium(7,8-dicarbaundeca) borate and tri-n-butylammonium (tridecahydride-7-carbaundeca) borate.

These compounds (F-3) may be used in combinations of two or more. In the present invention, at least one compound selected from the components (F-1), (F-2) and (F-3) as aforementioned is used as the co-catalyst component (F) and these components may be used by optionally combining these compounds. It is desirable to use at least the component (F-2) or (F-3) among these components as the co-catalyst component (F).

In the present invention, it is desirable to use a catalyst containing the aforementioned metallocene catalyst component and co-catalyst component and it is also typically preferable that these catalyst components be brought into contact with a particle support compound and used as a support carrying type catalyst (solid catalyst).

As the support compound, a granular or fine particle solid having a particle diameter of 10 to 300 μm and preferably 20 to 200 μm is used. This support preferably has a specific surface area of typically 50 to 1000 m²/g and a pore volume of 0.3 to 2.5 cm³/g.

As such a support, porous inorganic oxides are preferably used. Specifically, $SiO_2$, $Al_2O_3$, MgO, $ZrO_2$, $TiO_2$, $B_2O_3$, CaO, ZnO, BaO, $ThO_2$ and the like or mixtures of these compounds, for example, $SiO_2$—MgO, $SiO_2$—$Al_2O_3$, $SiO_2$—$TiO_2$, $SiO_2$—$V_2O_5$, $SiO_2SiO_2$—$TiO_2$—MgO and the like are used. Among these compounds, those having $SiO_2$ and/or $Al_2O_3$ as their major components are preferable. The above inorganic oxide may contain carbonates, sulfates, nitrates and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, K $Li_2O$ in a small amount.

As the support, organic compounds may be used. For example, (co) polymers produced using α-olefins having 2 to 14 carbon atoms such as ethylene, propylene, 1-butene and 4-methyl-1-pentene as the major components or polymers or copolymers produced using vinylcyclohexane and styrene as the major components may be used.

It is desirable that the support be brought into contact with the above each component at a temperature of typically –50 to 150° C. and preferably –20 to 120° C. for 1 minute to 50 hours and preferably 10 minutes to 25 hours.

In the solid catalyst prepared in the above manner, the metallocene compound (E) is preferably carried in an amount of $5 \times 10^{-6}$ to $5 \times 10^{-4}$ gram atom and preferably $10^{-5}$ to $2 \times 10^{-4}$ gram atom as a transition metal atom per 1 g of the support and the component (F) is preferably carried in an amount of $10^{-3}$ to $5 \times 10^{-2}$ gram atom and preferably $2 \times 10^{-3}$ to $2 \times 10^{-2}$ gram atom as an aluminum atom or a boron atom per 1 g of the support.

Further, in the present invention, although the solid catalyst as aforementioned may be used for polymerization as it is, it may be used after it is formed as a pre-polymerized catalyst by pre-polymerizing the olefin thereon.

In the present invention, the solid catalyst or the pre-polymerized catalyst is preferably used in an amount of typically $10^{-8}$ to $10^{-3}$ gram atom/l and further $10^{-7}$ to $10^{-4}$ gram atom/l in terms of transition metal/l (polymerization volume).

In addition, although the component (F) may be used or not when using the pre-polymerized catalyst, it may be used, according to the need, in an amount of 5 to 300, preferably 10 to 200 and more preferably 15 to 150 in terms of the atomic ratio of aluminum or boron (Al or B/transition metal) to the transition metal in the polymerization system.

In the present invention, a polyolefin can be obtained in the form of a granular particle by a vapor phase polymerization as aforementioned. It is desirable that the average particle diameter of this particle be about 250 to 3000 μm and preferably about 400 to 1500 μm.

In the present invention, it is particularly desirable to produce linear low-density polyethylene having a density (ASTM D150E) of 0.865 to 0.940 g/cm³ and preferably 0.880 to 0.920 g/cm³. This linear low-density polyethylene preferably contains the structural unit derived from ethylene in an amount of 87.0 to 97.6 mol % and preferably 90.0 to 96.8 mol % and the structural unit derived from α-olefins having 4 to 10 carbon atoms in an amount of 13.0 to 2.4 mol % and preferably 10.0 to 3.2 mol %.

It should to be noted that the polyolefin may contain the unit derived from other copolymerizing monomers such as polyenes and the like in an amount of 10% by weight or less, preferably 5% by weight or less and particularly preferably 3% by weight or less to the extent that the object of the present invention is not impaired.

EFFECT OF THE INVENTION

According to the present invention, a process for producing a polyolefin can be provided, the process ensuring that the prevention of clogging caused by the generation of sheet or chunk polymers and a high efficiency of the production of a polyolefin due to good catalytic activity can be accomplished at the same time and also having superb continuous productivity.

EXAMPLE

The present invention will be hereinafter explained in more detail byway of examples, which, however, are not intended to be limiting of the present invention.

Example 1

Preparation of a Solid Catalyst Component 10 kg of silica ($SiO_2$) which had been dried at 250° C. for 10 hours was suspended in 154 l of toluene, which was then cooled to 0° C. To the suspension solution was added dropwise 50.5 l of a toluene solution of methylaluminoxane (Al=1.52 mol/l) over one hour with keeping the temperature of the suspension solution at 0 to 5° C. In succession, the resulting solution was kept at 0° C. for 30 minutes, then the temperature was raised to 95° C. over 1.5 hours and the solution was kept at 95° C. for 4 hours.

Thereafter, the solution was dropped to 60° C. and the supernatant was removed by decantation. The solid catalyst component obtained in this manner was washed twice with toluene and then redispersed in 100 l of toluene to be a total amount of 160L.

22.0L of a toluene solution of bis(1,3-n-butylmethylcyclopentadienyl)zirconium dichloride (Zr= 25.7 mmol/l) was added dropwise to the obtained suspension solution at 80° C. over 30 minutes and the resulting solution was further kept at 80° C. for 2 hours. Thereafter, the supernatant was removed and the residue was washed twice with hexane to obtain a solid catalyst component containing zirconium in an amount of 3.2 mg per 1 g of silica.

Prepolymerization of the Solid Catalyst Component

A 350l reactor in which the atmosphere was thoroughly replaced by nitrogen was charged with 7.0 kg of the above solid catalyst component and then filled with hexane to prepare a hexane suspension solution having a total volume of 285L.

The system was cooled to 0° C. and then ethylene was blown into the hexane suspension solution of the solid catalyst component at a rate of 8 Nm$^3$/hr for 5 minutes. During this time, the system temperature was kept at 10 to 15° C.

After the supply of ethylene was suspended for a time, 2.4 mol of triisobutylaluminum and 1.2 kg of 1-hexene were supplied to the system, which was then made to be a closed system and then, the supply of ethylene was resumed. Ethylene was supplied at a flow rate of 8 Nm$^3$/hr for 15 minutes and then flow rate was dropped to 2 Nm$^3$/hr to set the pressure in the system to 0.8 kg/cm$^2$-G. During this operation, the temperature of the system rose to 35° C.

Thereafter, ethylene was supplied at a flow rate of 4 Nm$^3$/hr for 3.5 hours with controlling the system temperature to 32 to 35° C. During this operation, the system was kept under a pressure of 0.7 to 0.8 kg/cm$^2$-G. Next, the atmosphere in the system was replaced by nitrogen and the supernatant was removed. Then, the residue was washed twice with hexane. The supernatant obtained after the prepolymerization was colorless and transparent.

A prepolymerization catalyst containing 3 g of a prepolymer per 1 g of the solid catalyst component was obtained in the above manner. The intrinsic viscosity [η] of this prepolymerization catalyst component (prepolymer) which was measured at 135° C. in decaline was 2.1 dl/g and the content of 1-hexene units was 4.8% by weight. The prepolymerization catalyst had a good shape and a bulk density of 0.4 g/cm$^3$.

Vapor Phase Polymerization

A continuous fluidized-bed reactor as shown in FIG. 1 was used to carry out vapor phase polymerization.

Specifically, the prepolymerization catalyst obtained in the above manner was continuously supplied at a rate of 67.8 g/hr to polymerize ethylene continuously in the presence of isopentane and a diethanolamide mixture (a mixture of diethanolamides represented by the chemical formula

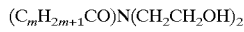
(C$_m$H$_{2m+1}$CO)N(CH$_2$CH$_2$OH)$_2$ wherein m was 7, 9, 11, 13, 15 and 17 to obtain a polyethylene (PE).

The polymerization was carried out in the following condition as shown in Table 1: polymerization temperature: 80° C., polymerization pressure: 1.7 MPa-G (gage pressure), partial pressure of ethylene: 1.1 MPa, space tower velocity: 0.60 m/s, diethanolamide mixture: 10×10$^{-6}$ g/g-polymerized polymer and concentration of isopentane in the gas (TOP gas) in the deceleration zone of the reactor: 20 mol %. During this polymerization, the average molecular weight of the TOP gas was 38.0 g/mol and the density of the TOP gas was 25.9 kg/m$^3$. Also, the dew point of the TOP gas was 78.1° C., the temperature of the outlet side of the circulating gas in the heat exchanger was 77.2° C. and the ratio of the condensed liquid at the outlet side of the circulating gas was 3% by weight. The above TOP gas was a mixture of ethylene, nitrogen, hydrogen, 1-hexene and isopentane and had an average molecular weight of 38 g/mol.

The polyethylene obtained in the above manner had a density (ASTM D1505) of 0.918 kg/m$^3$ and an MFR (ASTM D1238, 190° C., load: 2.16 kg) was 3.8 g/10 minutes as shown in Table 1. The bulk density of the particle was calculated from the weight of the particle in 100 ml. Also, the polymerization amount (STY; Space Time Yield) per unit volume was 100 kg/h·m$^3$ and the catalyst activity was 5900 g-PE/g-bare catalyst. No block (e.g. sheet or/and chunk) polyethylene was generated.

Examples 2 to 6 and Comparative Examples 1 to 7

Polyethylenes (PE) were obtained in the same manner as in Example 1 except that the ethylene polymerization condition was altered to that shown in Table 1.

The qualities of the resulting polyethylenes and the like are shown in Table 1.

As is understood from Table 1, in Comparative Example 1 using neither isopentane (saturated aliphatic hydrocarbon) nor the diethanolamide mixture (fatty acid diethanolamide), the bulk density of the particle was dropped and a block polymer was generated in a large amount, which made it difficult to carry out a stable operation. Also, in Comparative Example 2 using isopentane but no diethanolamide mixture, the bulk density of the particle was raised, but the generation of a block polymer was incompletely eliminated though considerably decreased. In Comparative Example 3 using the diethanolamide mixture but no isopentane, the bulk density was significantly decreased, but no block polymer was generated and the catalyst activity was decreased. On the contrary, in Example 1 using both of isopentane and the diethanolamide mixture (fatty acid diethanolamide), the particle had a high bulk density, the catalyst activity was dropped a little and no block polymer was generated.

When the polymerization amount (STY) per unit volume was increased twice, a block polymer was generated in Comparative Examples 5 and 6 using only either one of isopentane and the diethanolamide mixture. Also, as shown in Comparative Example 6, the generation of a block polymer was not eliminated, the bulk density of the particle was significantly dropped and the activity was decreased greatly even if the amount of the diethanolamide mixture was increased five times. On the other hand, a reduction in catalyst activity was small and no block polymer was generated though the bulk density of the particle was lower than that of Example 1.

Moreover, when the STY was raised as shown in Comparative Example 7, a block was generated in a large amount, which made it inevitable to open the reactor to remove the block. On the other hand, isopentane was added in a concentration of 1 mol % in the gas as shown in Example 3, the generation of a block was decreased outstandingly even though the bulk density was relatively low. When the concentration of isopentane was raised as shown in Examples 4 to 6, the bulk density of the particle was raised and a block was more decreased. When the amount of isopentane was 20 mol %, no block was generated.

Examples 7 to 12 and Comparative Example 8

Polyethylenes were obtained in the same manner as in Examples 5 and 6 except that the conditions of ethylene polymerization was altered to those shown in Table 2. In Examples 9 to 12, the polymerization temperature was fluctuated within a range from 77 to 83° C. in the meaning of a disturbance.

The qualities of the obtained polyethylenes and the like are shown in Table 2.

When a nonionic surfactant constituted only of carbon, oxygen and hydrogen atoms was used in place of the diethanolamide mixture as shown in Example 7, the bulk density of the particle and the catalyst activity were higher than those in Example 6 and no block polymer was generated, enabling a stable operation.

As shown in Example 8, even if the concentration of isopentane was dropped to half the concentration of isopentane of Example 7, the bulk density of the particle and the catalyst activity were higher than those in Example 5 and no block polymer was generated, enabling a stable operation.

As shown in Comparative Example 8 performed in the absence of isopentane, only a nonionic surfactant constituted only of carbon, oxygen and hydrogen atoms could not suppress the generation of a block polymer and the generation of a block polymer made it difficult to continue a stable operation.

In case of using the diethanolamide mixture together with the nonionic surfactant as shown in Example 9, in spite of decreased bulk density of the particle and the decreased catalyst activity compared to Example 7, catalyst activity was higher than that of Example 6 and no block polymer was generated, enabling a stable operation even if disturbance was applied.

As shown in Example 10, the bulk density of the particle and the catalyst activity were high under the presence of only the nonionic surfactant constituted only of carbon, oxygen and hydrogen atoms even if a disturbance was applied, but the generation of a block polymer was observed. On the other hand, under the presence of only the diethanolamide mixture as in the case of Example 11, the generation of a block polymer was observed in the same manner as in Example 10 when a disturbance was applied.

As shown in Example 12, when under the presence of only the nonionic surfactant, the concentration of isopentane was made lower than that in comparative Example 9 and a disturbance was applied, a block polymer was generated in a larger amount than in the case of Comparative Example 9.

TABLE 1

|  |  | Ex 1 | Comp. Ex 1 | Comp. Ex 2 | Comp. Ex 3 | Ex 2 | Comp. Ex 4 | Comp. Ex 5 |
|---|---|---|---|---|---|---|---|---|
| Polymerization temperature | ° C. | 80 | 80 | 80 | 80 | 80 | 80 | 80 |
| Polymerization pressure | MPaG | 1.7 | 1.7 | 1.7 | 1.7 | 1.7 | 1.7 | 1.7 |
| Partial pressure of ethylene | MPaG | 1.1 | 1.1 | 1.1 | 1.1 | 1.1 | 1.1 | 1.1 |
| Space tower velocity | m/s | 0.60 | 0.60 | 0.60 | 0.60 | 0.60 | 0.60 | 0.60 |
| Concentration of isopentane in the TOP gas in the polymerization unit | mol % | 20 | 0 | 20 | 0 | 5 | 20 | 0 |
| Average molecular weight of the TOP gas in the polymerization unit | g/mol | 38.0 | 29.2 | 38.0 | 29.2 | 31.4 | 38.0 | 29.2 |
| Density of the TOP gas in the polymerization unit | kg/m$^3$ | 25.9 | 18.5 | 25.9 | 18.5 | 20.3 | 25.9 | 18.5 |
| Dew point of the TOP gas in the polymerization unit | ° C. | 78.1 | 32.7 | 78.1 | 32.7 | 48.0 | 78.1 | 32.7 |
| Temperature of the outlet side of the circulating gas cooler | ° C. | 77.2 | 72.6 | 77.2 | 72.6 | 70.8 | 75.0 | 65.3 |
| Ratio of the condensed liquid at the outlet side of the circulating gas cooler | wt % | 1.3 | 0 | 1.3 | 0 | 0 | 3.3 | 0 |
| Aliphatic amide[1] | 10$^{-6}$ g/g-polymerization polymer | 10 | 0 | 0 | 50 | 10 | 0 | 10 |
| Nonionic surfactant[2] | 10$^{-6}$ g/g-polymerization polymer | 0 | 0 | 0 | 0 | 0 | 0 | 0 |
| Bulk density of the polyolefin particle | kg/cm$^3$ | 459 | 402 | 466 | 368 | 401 | 467 | 394 |
| Density of the polyolefin | kg/cm$^3$ | 918 | 918 | 918 | 918 | 918 | 918 | 918 |
| Polyolefin MFR | g/10 min | 3.8 | 3.8 | 3.8 | 3.8 | 3.8 | 3.8 | 3.8 |
| Retention time | h | 3.4 | 3.4 | 3.4 | 3.4 | 1.7 | 1.7 | 1.7 |
| STY[3] | kg/h · m$^3$ | 100 | 100 | 100 | 100 | 200 | 200 | 200 |

TABLE 1-continued

| | | | | | | | | |
|---|---|---|---|---|---|---|---|---|
| Catalyst activity | g-PE/g-bare cat. | 5900 | 5800 | 6100 | 3900 | 3000 | 3200 | 2900 |
| | g-PE/g-bare cat.h | 1735 | 1706 | 1794 | 1147 | 1765 | 1882 | 1706 |
| Amount of generation of a block polymer | g/h | 0 | 30 | 5 | 0 | 0 | 10 | 40 |
| Generation of clogging | | None | Exist | None | None | None | None | Exist |

| | | Comp. Ex 6 | Ex 3 | Ex 4 | Ex 5 | Ex 6 | Comp. Ex 7 |
|---|---|---|---|---|---|---|---|
| Polymerization temperature | °C. | 80 | 80 | 80 | 80 | 80 | 80 |
| Polymerization pressure | MPaG | 1.7 | 1.7 | 1.7 | 1.7 | 1.7 | 1.7 |
| Partial pressure of ethylene | MPaG | 1.1 | 1.1 | 1.1 | 1.1 | 1.1 | 1.1 |
| Space tower velocity | m/s | 0.60 | 0.60 | 0.60 | 0.60 | 0.60 | 0.60 |
| Concentration of isopentane in the TOP gas in the polymerization unit | mol % | 0 | 1 | 5 | 10 | 20 | 0 |
| Average molecular weight of the TOP gas in the polymerization unit | g/mol | 29.2 | 29.6 | 31.4 | 33.6 | 38.0 | 29.2 |
| Density of the TOP gas in the polymerization unit | kg/m$^3$ | 18.5 | 18.9 | 20.3 | 22.0 | 25.9 | 18.5 |
| Dew point of the TOP gas in the polymerization unit | °C. | 32.7 | 35.8 | 48 | 59.8 | 78.1 | 32.7 |
| Temperature of the outlet side of the circulating gas cooler | °C. | 65.3 | 67.3 | 68.6 | 69.9 | 75.0 | 67.0 |
| Ratio of the condensed liquid at the outlet side of the circulating gas cooler | wt % | 0 | 0 | 0 | 0 | 4.3 | 0 |
| Aliphatic amide[*1] | $10^{-6}$ g/g-polymerization polymer | 50 | 15 | 15 | 15 | 15 | 15 |
| Nonionic surfactant[*2] | $10^{-6}$ g/g-polymerization polymer | 0 | 0 | 0 | 0 | 0 | 0 |
| Bulk density of the polyolefin particle | kg/cm$^3$ | 368 | 392 | 398 | 411 | 455 | 390 |
| Density of the polyolefin | kg/cm$^3$ | 918 | 918 | 918 | 918 | 918 | 918 |
| Polyolefin MFR | g/10 min | 3.8 | 3.8 | 3.8 | 3.8 | 3.8 | 3.8 |
| Retention time | h | 1.7 | 1.4 | 1.4 | 1.4 | 1.4 | 1.4 |
| STY[*3] | kg/h · m$^3$ | 200 | 250 | 250 | 250 | 250 | 250 |
| Catalyst activity | g-PE/g-bare cat. | 2300 | 2350 | 2450 | 2600 | 2750 | 2400 |
| | g-PE/g-bare cat.h | 1353 | 1728 | 1801 | 1912 | 2022 | 1765 |
| Amount of generation of a block polymer | g/h | 15 | 10 | 10 | 5 | 0 | 80 |
| Generation of clogging | | None | None | None | None | None | Exist |

[*1] Aliphatic amide: higher fatty acid diethanolamide mixture, a mixture of compounds represented by the formula $(C_mH_{2m+1}CO)N(CH_2CH_2OH)_2$ wherein m = 7, 9, 11, 13, 15 and 17: Chemistat 2500 ™ manufactured by Sanyo Chemical Industries, Ltd.
[*2] Nonionic surfactant: Adeeka Pluronic L-71 ™ manufactured by Asahi Denka Kogyo K.K, chemical formula HO—$(C_2H_4O)_a$—$(C_3H_6O)_b$—$(C_2H_4O)_c$—H.
[*3] STY: Space Time Yield, polymerization amount (kg/h) per unit area (m$^3$).

TABLE 2

| | | Ex 7 | Ex 8 | Comp. Ex 8 | Ex 9 | Ex 10 | Ex 11 | Ex 12 |
|---|---|---|---|---|---|---|---|---|
| Polymerization temperature | °C. | 80 | 80 | 80 | 80 ± 3 | 80 ± 3 | 80 ± 3 | 80 ± 3 |
| Polymerization pressure | MpaG | 1.7 | 1.7 | 1.7 | 1.7 | 1.7 | 1.7 | 1.7 |
| Partial pressure of ethylene | MPaG | 1.1 | 1.1 | 1.1 | 1.1 | 1.1 | 1.1 | 1.1 |
| Space tower velocity | m/s | 0.60 | 0.60 | 0.60 | 0.60 | 0.60 | 0.60 | 0.60 |
| Concentration of isopentane in the Top gas in the polymerization unit | mol % | 20 | 10 | 0 | 20 | 20 | 20 | 10 |
| Average molecular weight of the TOP gas in the polymerization unit | g/mol | 38.0 | 33.6 | 29.2 | 38.0 | 38.0 | 38.0 | 33.6 |

TABLE 2-continued

| | | Ex 7 | Ex 8 | Comp. Ex 8 | Ex 9 | Ex 10 | Ex 11 | Ex 12 |
|---|---|---|---|---|---|---|---|---|
| Density of the TOP gas in the polymerization unit | kg/m³ | 25.9 | 22 | 18.5 | 25.9 | 25.9 | 25.9 | 22.0 |
| Dew point of the TOP gas in the polymerization unit | °C. | 78.1 | 59.8 | 32.7 | 78.1 | 78.1 | 78.1 | 59.8 |
| Temperature of the outlet side of the circulating gas cooler | °C. | 75.0 | 69.9 | 67.0 | 75.0 | 75.0 | 75.0 | 69.9 |
| Ratio of the condensed liquid at the outlet side of the circulating gas cooler | wt % | 4.3 | 0 | 0 | 4.3 | 4.3 | 4.3 | 0 |
| Diethanolamide mixture | $10^{-6}$ g/g-polymerization polymer | 0 | 0 | 0 | 7.5 | 0 | 15 | 0 |
| Nonionic surfactant | $10^{-6}$ g/g-polymerization polymer | 3 | 3 | 3 | 1.5 | 3 | 0 | 3 |
| Bulk density of the polyolefin particle | kg/m³ | 465 | 421 | 401 | 461 | 466 | 454 | 420 |
| Density of the polyolefin | kg/m³ | 918 | 918 | 918 | 918 | 918 | 918 | 918 |
| Polyolefin MFR | g/10 min | 3.8 | 3.8 | 3.8 | 3.8 | 3.8 | 3.8 | 3.8 |
| Retention time | h | 1.4 | 1.4 | 1.4 | 1.4 | 1.4 | 1.4 | 1.4 |
| STY | kg/h · m³ | 250 | 250 | 250 | 250 | 250 | 250 | 250 |
| Catalyst activity | g-PE/g-bare cat. | 3750 | 3550 | 2550 | 3400 | 3750 | 2750 | 3550 |
| | g-PE/g-bare cat.h | 2757 | 2610 | 1875 | 2500 | 2757 | 2022 | 2610 |
| Amount of generation of a block polymer | g/h | 0 | 0 | 60 | 0 | 10 | 10 | 40 |
| Generation of clogging | | None | None | Exist | None | None | None | Exist |

*¹⁾Aliphatic amide: higher fatty acid diethanolamide mixture, a mixture of compounds represented by the formula $(C_mH_{2m+1}CO)N(CH_2CH_2OH)_2$ wherein m = 7, 9, 11, 13, 15 and 17: Chemistat 2500 ™ manufactured by Sanyo Chemical Industries, Ltd.
*²⁾Nonionic surfactant: Adeka Pluronic L-71 ™ manufactured by Asahi Denka Kogyo K.K, chemical formula HO—$(C_2H_4O)_a$—$(C_3H_6O)_b$—$(C_2H_4O)_c$—H.
*³⁾STY: Space Time Yield, polymerization amount (kg/h) per unit area (m³).

What is claimed is:

1. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein fluidizing gas is introduced at a flow rate so as to maintain the fluidized bed of the fluidized bed reactor in a fluidizing state by the gas, and the amount of said gas is $3U_{mf}$ to $50U_{mf}$, wherein $U_{mf}$ is the minimum fluidizing rate of the fluidized bed.

2. A process for producing a polyolefin according to claim 1, wherein said saturated aliphatic hydrocarbon is supplied to the inside of said fluidized-bed reactor in a vapor-liquid two-phase state together with said α-olefin and at least one compound selected from the aliphatic amide (B) and the nonionic surfactant (C) constituted only of carbon, oxygen and hydrogen atom to remove at least a part of polymerization heat by the vaporization of the liquid saturated aliphatic hydrocarbon.

3. A process for producing a polyolefin according to claim 1, wherein said polyolefin is a copolymer of ethylene and at least one α-olefin having 3 to 20 carbon atoms.

4. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein in the case of making said aliphatic amide (B) exist, the aliphatic amide is made to exist in an amount of $0.1 \times 10^{-6}$ to $400 \times 10^{-6}$ parts by weight based on one part by weight of the produced polyolefin in said fluidized-bed reactor.

5. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein said aliphatic amide (B) is a fatty acid diethanolamide represented by the following formula (I):

$$(C_mH_{2m+1}CO)N(CH_2CH_2OH)_2 \qquad (I)$$

wherein m is integer in a range from 1 to 30.

6. A process for producing a polyolefin according to claim 1, wherein in the case of making said nonionic surfactant (C) exist, the non ionic surfactant is made to exist in an amount of $0.1 \times 10^{-6}$ to $200 \times 10^{-6}$ parts by weight based on one part by weight of the produced polyolefin in said fluidized-bed reactor.

7. A process for producing a polyolefin according to claim 1, wherein said nonionic surfactant (C) is a polyoxyalkylene glycol represented by the following formula (II):

$$HO-(CH_2CH_2O)_m-[CH_2CH(CH_3)O]_n-(CH_2CH_2O)_pH \qquad (II)$$

wherein m, n and p denote the numbers of average repeat units, wherein m is in a range from 1 to 20, n is in a range from 2 to 50 and p is in a range from 1 to 20.

8. The process for producing a polyolefin according to claim 1, wherein said α-olefin is at least one selected from the group consisting of ethylene, propylene, 1-butene, 1-pentene, 1-hexene, 4-methyl-1-pentene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene.

9. The process for producing a polyolefin according to claim 1, wherein said saturated aliphatic hydrocarbon comprises 4 to 20 carbon atoms.

10. The process for producing a polyolefin according to claim 9, wherein said saturated aliphatic hydrocarbon is selected from the group consisting of n-butane, i-butane, n-pentane, i-pentane, hexane, heptane, octane, nonane, decane, dodecane, 2,2-dimethylpropane, 2,2-dimethylbutane, 2,3-dimethylbutane, 2,2,3-trimethylbutane, 2-methylpentane, 3-methylpentane, 2,2dimethylpentane, 3,3-dimethylpentane, 2,3-dimethylpentane, 2,4-dimethylpentane, 2-methylhexane, 3-methylhexane, 4-methylhexane, 2,3-dimethylhexane, cyclopentane, cyclohexane, methylcyclopentane and dimethylcyclopentane.

11. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein said saturated aliphatic hydrocarbon is supplied to the fluidized-bed reactor in a vapor-liquid two-phase state to remove polymerization heat by the vaporization of liquid phase saturated aliphatic hydrocarbon.

12. The process for producing a polyolefin according to claim 1, wherein the concentration of (A) the saturated aliphatic hydrocarbon in the fluidized bed reactor is 1 to 25 mol %.

13. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein in the aliphatic amide (B) exists in an amount of $5 \times 10^{-6}$ to $100 \times 10^{-6}$ parts by weight based on one part by weight of the produced polyolefin in said fluidized-bed reactor.

14. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein the aliphatic amide comprises 4 to 40 carbon atoms.

15. The process for producing a polyolefin according to claim 5, wherein said fatty acid diethanolamide is at least one selected from the group consisting of hexanoic acid diethanolamide, heptanoic acid diethanolamide, octanoic acid diethanolamide, nonanoic acid diethanolamide, decanoic acid diethanolamide, undecanoic acid diethanolamide, lauric acid diethanolamide, tridecylic acid diethanolamide, myristic acid diethanolamide, pentadecylic acid diethanolamide, palmitic acid diethanolamide, heptadecanoic acid diethanolamide and stearic acid diethanolamide.

16. The process for producing a polyolefin according to claim 1, wherein the nonionic surfactant (C) constituted only of carbon, oxygen and hydrogen atoms is selected from at least one of the group consisting of polyoxyethylene lauryl ether, polyoxyethylene oleyl ether, polyoxyalkylene lauryl ether, polyoxyethylene isodecyl ether, polyoxyethylene alkyl ether, polyoxyalkylene alkyl ether, polyoxyethylene castor oil, polyoxyethylene hydrogenated castor oil, polyoxyethylene styrenated phenyl ether, polyoxyethylene oleate, polyoxyethylene distearate, polyoxyalkylene glycol, sorbitan sesquioleate, sorbitan monooleate, sorbitan monostearate, sorbitan monolaurate, polyoxyethylenesorbitan monolaurate, polyoxyethylenesorbitan monostearate, polyoxyethylenesorbitan monooleate, polyoxyethylene lanolin alcohol ether, polyoxyethylenelanoline fatty acid ester, polyoxyethylene alkylamine ether, polyethylene glycol alkyl ether, polyethylene glycol monolaurate, polyethylene glycol monostearate, polyethylene glycol monooleate, polyethylene glycol sorbitan monolaurate and polyethylene glycol sorbitan monooleate.

17. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein the ratio [(C)/(B)] of the nonionic surfactant to the aliphatic amide is 1/20 to 1/3 (ratio by weight).

18. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein the polymerization pressure in the fluidized bed of the reactor is in a range from 0.098 to 9.8 Mpa.

19. A process for producing a polyolefin, the process comprising (co)polymerizing one or two or more α-olefins in a vapor phase in a fluidized-bed reactor, wherein the concentration of (A) a saturated aliphatic hydrocarbon in the fluidized bed reactor is 1 mol % or more and at least one compound selected from (B) an aliphatic amide and (C) a nonionic surfactant constituted only of carbon, oxygen and hydrogen atoms is made to exist in the reactor, wherein the polymerization temperature is a temperature less than the dew point +20° C. of the vapor phase in the reactor.

* * * * *